Patented Jan. 26, 1932

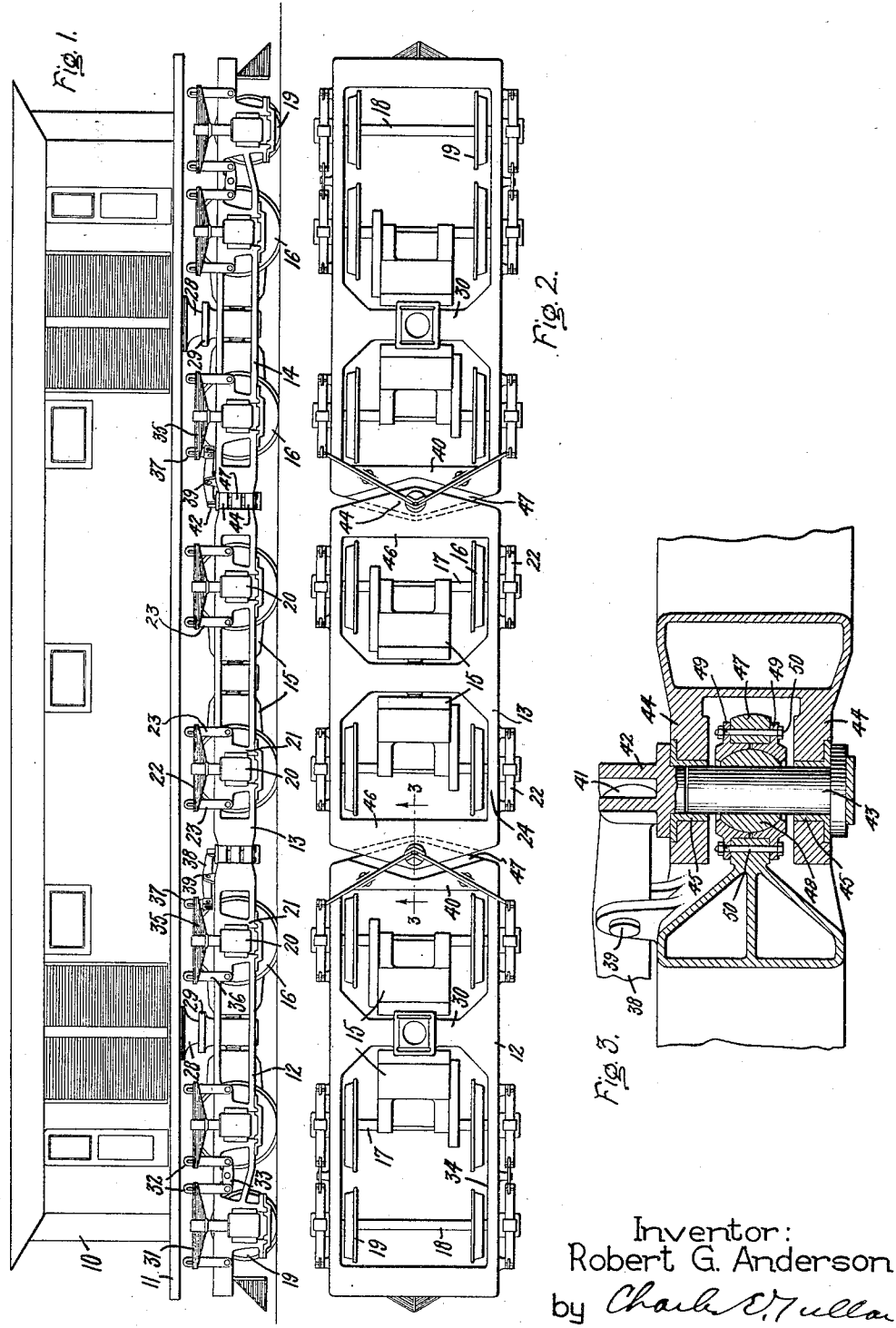

1,842,955

UNITED STATES PATENT OFFICE

ROBERT G. ANDERSON, OF HARBORCREEK, PENNSYLVANIA, ASSIGNOR TO GENERAL ELECTRIC COMPANY, A CORPORATION OF NEW YORK

LOCOMOTIVE

Application filed December 22, 1930. Serial No. 503,877.

My invention relates to locomotives and cars and more particularly to the type of locomotive and car having an articulated truck construction.

In current practice a locomotive or car having more than two articulated trucks in connection with its driving mechanism usually has some means for distributing part of the load on the end trucks and part on the intermediate trucks. This is often accomplished by various means of supporting the weight of the locomotive or car on supports arranged on each truck, but this type of construction has the disadvantage of requiring the support on the intermediate trucks being constructed for lateral motion to provide sufficient flexibility to the construction so that the locomotive or car can easily take curves in the track without liability of derailment.

The object of my invention is to provide a simplified and improved means for distributing the load on all the drivers of the locomotive or car which uses more than two articulated trucks in connection with its driving mechanism and to provide a construction which will easily take curves which may be in the track without liability of derailment. I accomplish this object by providing in combination with a car frame, more than two articulated trucks and means supporting the superstructure of the locomotive or car on the trucks at both ends, and a flexible means for transmitting a portion of the load from the end truck to an intermediate truck at their articulation.

My invention will be better understood from the following description referring to the accompanying drawings and the features of novelty which characterize my invention will be pointed out with particularity in the claims annexed to and forming a part of this specification.

In the drawings, Fig. 1 is a side elevation of an electric locomotive having an articulated truck construction employing an embodiment of my invention; Fig. 2 is a plan view of Fig. 1 with the locomotive superstructure removed; Fig. 3 is an enlarged detail sectional view on line 3—3 of Fig. 2 showing the construction of the articulated coupling and the load transferring means at the articulation of the trucks.

Referring to the drawings, an electric locomotive is shown having a cab 10 mounted on an underframe 11 or other suitable supporting frame and three articulated trucks 12, 13 and 14. The locomotive is driven by motors 15 connected to driving wheels 16 through axle 17. The end trucks are also provided with a guiding axle 18 and wheels 19. The truck frame pedestals 21 engage the journal boxes 20 and the truck frames are supported thereon by side spring rigging. On the intermediate trucks this side spring rigging includes the semi-elliptic springs 22 connected by spring hangers 23 to the side frame 24.

In accordance with my invention the underframe 11 is supported by two pivotal body center-plates 28 cooperating with truck center-plates 29, one on each of the end trucks. The truck center-plates are supported by transoms 30 which are located on the end truck frames in such a position that part of the weight of the superstructure acting on the end truck is transmitted to the middle truck through an equalizer system connected to the side spring rigging at the truck coupling. The side spring rigging of the end truck comprises two separate sections. One of these sections is located adjacent the outer end of the truck and includes semi-elliptic springs 31 connected by spring hangers 32 to an equalizer 33 and to the side frame 34 of the truck. The other section is arranged adjacent the inner end of the truck and includes the semi-elliptic spring 35 connected by hanger 36 to the side frame 34 and by hanger 37 to a diagonally extending equalizer lever 38 which is fulcrumed at 39 on the end frame 40 of the trucks. As more clearly shown in Fig. 3 the end 41 of the equalizer 38 rests on the head 42 above a coupling-pin 43 and is adapted to transmit load to the truck. This coupling-pin 43 forms a pivotal articulation for the trucks. The end frames 46 of the middle truck are formed with sills 44 having vertically aligned openings therein arranged on the longitudinal center line of the trucks and having bearings 45 therein. The inner end frame 40 of each of the end trucks is formed with a sill 47 fitting loosely between the sills 44. The sill 47 has a vertically extending opening therethrough on the longitudinal center line of the truck and includes a bearing 48 journalled in a split bearing housing 49, which is secured within the opening in the sill and fastened together and to the sill by bolts 50. The coupling-pin 43 extends through the bearings 45 and 48, thereby pivotally connecting the trucks together. This arrangement provides means for supporting the car frames on pivotal supports on the two end trucks located in such a position as to cooperate with the spring rigging and diagonal equalizers to provide a flexible means for transmitting a portion of the load from the end trucks to the intermediate trucks at their articulation and thereby equalize the load on all of the trucks and gives a flexible structure which will easily take curves in the track without liability of derailment.

While I have illustrated and described one embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A locomotive or car including a plurality of articulated trucks, one of said trucks having a frame and wheels and axles, spring means for supporting said frame on said wheels and axles, and means including diagonal equalizers connected to said spring supporting means and carried by the adjacent truck at the articulation of the trucks for distributing the load between the trucks.

2. In combination with a locomotive or car, a supporting frame, a plurality of articulated trucks, each of said trucks having a frame and a plurality of wheels and axles, journal boxes for said axles, a spring means supporting said truck frame on said journal boxes, supports for said supporting frame at each end on the end trucks, pivotal means coupling said truck frames together, and diagonally extending levers connected to said spring supporting means and carried by the adjacent truck at said pivotal coupling for distributing the load between the articulated trucks.

3. In combination with a locomotive or car, a supporting frame, a plurality of articulated trucks, each of said trucks having a frame and a plurality of wheels and axles, journal boxes for said axles, spring means supporting said truck frame in said journal boxes, pivotal supports for said supporting frame on the end trucks, pivotal means coupling said truck frames together, and means including diagonally extending levers connected to said spring supporting means at the inner end of the end trucks and carried by the adjacent truck at said pivotal coupling for distributing the load between the articulated trucks.

4. In combination with a locomotive or car, an underframe, more than two articulated trucks, each of said trucks having a frame and a plurality of wheels and axles, journal boxes for said axles, a spring means supporting said truck frame on said journal boxes, pivotal coupling means for said truck, diagonally extending equalizers connected to said spring supporting means and carried by the adjacent truck at said pivotal coupling, and pivotal supports for said underframe on each of the end trucks, so that the weight carried by said underframe is transmitted by said diagonal equalizers to an intermediate truck.

5. In combination with a locomotive or car, an underframe, more than two articulated trucks, each of said trucks having a truck frame and a plurality of wheels and axles, a side spring suspension system supporting said truck frame on said journal boxes, articulated coupling means for each of said trucks including vertically spaced sills on one of said trucks and a sill on end frame of the adjacent truck fitting loosely between said spaced sills, means pivotally connecting said sills, diagonally extending equalizers connected to said side spring suspension system of the end trucks and carried by the adjacent truck at said coupling, and pivotal supports for said underframe on the end trucks, said supports being independent of the other trucks so that part of the weight of the locomotive or car is transmitted by said diagonal equalizers to the other trucks and the desired distribution of the load on all the trucks is obtained.

In witness whereof, I have hereunto set my hand this 19th day of December, 1930.

ROBERT G. ANDERSON.